US011262175B2

(12) United States Patent
Bersch et al.

(10) Patent No.: US 11,262,175 B2
(45) Date of Patent: Mar. 1, 2022

(54) METHOD AND APPARATUS FOR MEASURING AN INDIVIDUAL'S ABTILITY TO PERFORM A VARYING RANGE OF BARRIER REACHES

(71) Applicant: PROGRESSIVEHEALTH REHABILITATION, INC., Evansville, IN (US)

(72) Inventors: Keith Bersch, Evansville, IN (US); Patrick Staples, Peachtree City, GA (US); Ricky Lockard, Newburgh, IN (US)

(73) Assignee: ProgressiveHealth Companies, LLC, Houston, TX (US)

( * ) Notice: Subject to any disclaimer, the term of this patent is extended or adjusted under 35 U.S.C. 154(b) by 543 days.

(21) Appl. No.: 15/424,869

(22) Filed: Feb. 5, 2017

(65) Prior Publication Data
US 2018/0221712 A1    Aug. 9, 2018

(51) Int. Cl.
*G01B 5/004* (2006.01)
*G01B 3/00* (2006.01)

(52) U.S. Cl.
CPC ............. *G01B 5/004* (2013.01); *G01B 3/004* (2013.01)

(58) Field of Classification Search
CPC ................................ G01B 5/004; G01B 3/004
See application file for complete search history.

(56) References Cited

U.S. PATENT DOCUMENTS

| 4,858,126 A | * | 8/1989 | Croce, Jr. | A61B 5/103 600/595 |
| 5,562,104 A | * | 10/1996 | Hochberg | A61B 5/4082 600/595 |
| 5,830,160 A | * | 11/1998 | Reinkensmeyer | A61B 5/1124 600/595 |

(Continued)

FOREIGN PATENT DOCUMENTS

| CN | 203663325 | 6/2014 |
| CN | 203861230 | 10/2014 |

(Continued)

OTHER PUBLICATIONS

Coffey et al, Evaluating the ability of novices to identify and quantify physical demand elements following an introductory education session: A pilot study, 2016, Elsevier, Applied Ergonomics 54, pp. 33-40 (Year: 2016).*

(Continued)

*Primary Examiner* — Lisa E Peters
(74) *Attorney, Agent, or Firm* — Martin IP Law Group; C. Richard Martin

(57) ABSTRACT

A method and apparatus for measuring a subject's ability to perform a varying range of barrier reaches is provided. The apparatus includes a barrier having a substantially horizontal upper surface at a height above a base point. A sensing and recording device is positioned adjacent to the barrier for sensing and recording a plurality of data points. A marking device for grasping by the subject engages the sensing and recording device for creating the plurality of data points as the subject bends forward against the barrier. The data points (Continued)

are recorded and converted into an interpolated arc reflecting the subject's reach at the barrier height.

20 Claims, 12 Drawing Sheets

(56) References Cited

U.S. PATENT DOCUMENTS

| | | | | |
|---|---|---|---|---|
| 6,227,047 | B1* | 5/2001 | Livingston | A61B 5/224 73/379.08 |
| 6,599,045 | B1* | 7/2003 | Kolb | B43K 29/00 33/18.2 |
| 8,915,868 | B1* | 12/2014 | Anderson | A61B 5/4561 33/511 |
| 9,295,422 | B2 | 3/2016 | Tai | |
| 2006/0028457 | A1* | 2/2006 | Burns | G06F 3/03545 345/179 |
| 2008/0133297 | A1* | 6/2008 | Schmotzer | G06F 19/3481 705/7.27 |
| 2009/0048074 | A1* | 2/2009 | Kamins | A61B 5/1071 482/52 |
| 2010/0179453 | A1* | 7/2010 | Schweighofer | A61B 5/1118 600/595 |
| 2010/0190617 | A1* | 7/2010 | Gautier | A63B 21/005 482/94 |
| 2013/0324857 | A1* | 12/2013 | Kurillo | A61B 5/1127 600/476 |
| 2015/0228078 | A1* | 8/2015 | Zahand | G06K 9/00771 382/103 |
| 2015/0293525 | A1* | 10/2015 | Yamamoto | G06T 19/20 702/182 |
| 2016/0070958 | A1* | 3/2016 | Whelan | A61B 5/7275 382/107 |
| 2016/0081594 | A1* | 3/2016 | Gaddipati | A61B 5/1113 600/595 |

FOREIGN PATENT DOCUMENTS

| | | | |
|---|---|---|---|
| JP | H10105536 | A * | 9/1996 |
| JP | H10105536 | * | 10/1997 |
| JP | 2005066233 | | 8/2003 |
| KR | 20130038684 | | 4/2013 |
| WO | 2012108422 | A1 | 8/2012 |

OTHER PUBLICATIONS

Ohcow, Physical Demands Description Handbook, Occupational Health Clinics for Ontario Workers Inc., pages i-20 (Year: 2014).*

* cited by examiner

METHOD AND APPARATUS FOR MEASURING AN INDIVIDUAL'S ABTILITY TO PERFORM A VARYING RANGE OF BARRIER REACHES

BACKGROUND OF THE INVENTION

Field of the Invention

The present invention relates to devices and processes for sampling, testing and measuring the range of motion and reach range of a test subject. More specifically, the present invention relates to a method and apparatus for sampling, testing and measuring a subject's ability to perform barrier-impeded reaches at varying barrier heights.

Description of the Problem

In the manufacturing industry, and more particularly in the automobile assembly industry, assembly line workers are required to perform a variety of reach tasks as part of their duties in assembling a vehicle. Those duties include reaching inside the engine compartment to install various components, reaching into the interior of the vehicle to install various interior components such as the dash assembly. Many of these tasks have a common feature that a creates barrier in the form of a part of the car, for example the fender where a worker is reaching into the engine compartment from the side of a vehicle, limits the worker's reach.

Some workers, based on their size, reach and/or range of motion are more adept at performing certain reach tasks that occur in the assembly process. Accordingly, there is a need for a method and apparatus that accurately and systematically measures the reach of assembly line workers at a variety of barrier heights to optimize the process of assigning tasks to assembly line workers.

SUMMARY OF THE INVENTION

It is therefore an objective of the present invention to provide a system and apparatus for systematically measuring the reach of a subject such as an assembly line worker given a variety of barrier heights.

It is also an objective of the invention to provide a systematic method for gathering and recording the barrier reach performance results of a subject, such as an assembly line worker, so that he/she may be assigned to assembly tasks that best suit his/her reaching abilities. Further, the invention will allow for the collection of barrier reach data such that manufacturers can design/redesign tasks so that those tasks are better matched to their employee/candidate population.

The present invention meets these objectives by providing an apparatus for measuring a subject's ability to perform a varying range of barrier reaches. The apparatus includes a barrier that has a substantially horizontal upper surface at a height above a base point; a sensing and recording device positioned adjacent to the barrier for sensing and recording a plurality of data points; a marking device for grasping by the subject, the marking device having a first end thereof that engages the sensing and recording device for creating the plurality of data points as the subject bends forward against the barrier and a second end; and processing means for converting the recorded data points into an interpolated arc reflecting the subject's reach at the barrier height.

According to one aspect of the invention, the height of the barrier is adjustable, and may include a plurality of pre-set variable heights. The barrier may preferably include seven pre-set variable heights ranging in 6-inch increments from 24 inches to 60 inches.

According to another aspect of the invention, the sensing and recording device comprises a two-dimensional grid for sensing and recording said plurality of data points in the vertical (y) and horizontal (x) axes relative to the base point. The plurality of data points may include a start point (Max Y) on the two-dimensional grid where the subject is positioned with its feet at the base point and its hands grasping the marking device extended overhead as high as possible; an end point (Min Y) on the two-dimensional grid where an arc is sensed and recorded on the two-dimensional grid as the subject bends forward against the barrier comes to an end at the lowest point in the vertical (y) axis above the base point; a furthest horizontal point (Max X) at a point on the arc in the horizontal (x) axis furtherest from the base point; a first point that is midway between the start point and the furthest horizontal point; and a second point that is midway between the end point and the furthest horizontal point.

According to a further aspect of the invention, the marking device includes a marking utensil at the end thereof that engages the sensing and recording device for creating a mark on the two-dimensional grid as the subject bends forward against the barrier with arms extended thereby drawing an arc on the grid with the marking utensil. The two-dimensional grid may be superimposed on an erasable surface and the marking utensil is erasable. According to one aspect of the invention, the erasable surface is a whiteboard and the marking utensil is a whiteboard marker.

In yet another aspect of the invention, the marking device is contained within a reach rack frame that controls the movement of the marking device relative to the sensing and recording device. The reach rack frame comprises: means for controlling the movement of the marking device in the vertical (y) axis relative to the base point; and means for controlling the movement of the marking device in the horizontal (x) axis relative to the base point. The means for controlling the movement of the marking device in the vertical axis may comprise a first substantially vertical support rod slidable attached to the first end of the marking device and a second substantially vertical support rod slidable attached to the second end of the marking device. The means for controlling the movement of the marking device in the horizontal (x) axis may comprise an upper substantially horizontal pair of slide channels which slideably engage upper ends of said first and second substantially vertical support rods, and a lower substantially horizontal pair of slide channels which slideably engage lower ends of said first and second substantially vertical support rods.

According to yet another aspect of the invention, there is provided a method for measuring a subject's ability to perform a varying range of barrier reaches. The method includes the steps of (1) positioning the subject at a barrier having a substantially horizontal upper surface at a height above a base point; (2) having the subject grasp a marking device having a first end thereof that engages a sensing and recording device; (3) having the subject raise the marking device overhead such that the first end of the marking device engages a surface of a sensing and recording device positioned adjacent to the barrier; (4) having the subject bend forward, while maintaining contact between the first end of the marking device and the surface of the sensing and recording device thereby drawing an arc on the sensing and recording device which includes a plurality of data points; (5) identifying and recording each of said plurality of data points; and (6) converting the recorded data points into an interpolated arc reflecting the subject's reach at the barrier height.

According to a further aspect of the invention, the method may include the further step of adjusting the height of the barrier and repeating steps (1)-(6) at the adjusted barrier height. Steps (1)-(6) may be repeated sequentially for seven pre-set variable heights ranging in 6-inch increments from 24 inches to 60 inches. The step of positioning a subject at a barrier includes having the subject come into contact with said barrier.

The step of identifying and recording the plurality of data points may comprise the steps of: identifying and recording a start point (Max Y) on the sensing and recording device where the subject is positioned with its feet at the base point and its hands grasping the marking device extended overhead as high as possible; identifying and recording an end point (Min Y) on the sensing and recording device where an arc is sensed and recorded on the two-dimensional grid as the subject bends forward against the barrier comes to an end at the lowest point in the vertical (y) axis above the base point; identifying and recording a furthest horizontal point (Max X) at a point on the arc in the horizontal (x) axis furtherest from the base point; identifying and recording a first point that is midway between the start point and the furthest horizontal point; and identifying and recording a second point that is midway between the end point and the furthest horizontal point.

These and other objectives, features, and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

Figure 1:
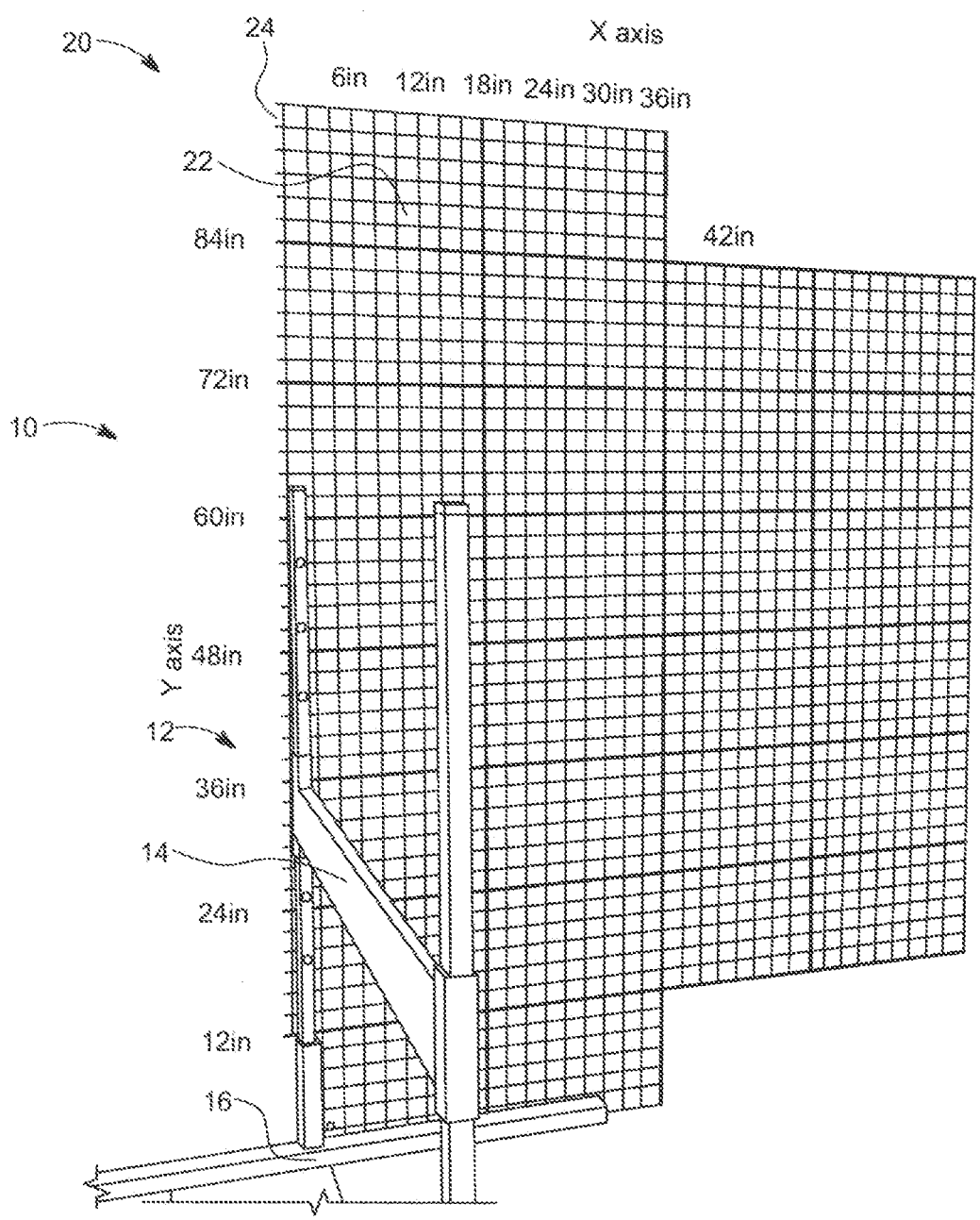
FIG. 1 is a side elevation view of an apparatus for measuring an individual's ability to perform a varying range of barrier reaches according to one presently preferred embodiment of the invention.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

As best shown in FIG. 1-FIG. 3C, one presently preferred embodiment of the invention comprises an apparatus 10 for measuring a subject's S ability to perform a varying range of barrier reaches. The apparatus 10 includes a variable barrier reach instrument 12 having a substantially horizontal barrier 14 at a height (h) above a base point 16 (0,0). The variable barrier reach instrument 12 is used to simulate a barrier that the person or subject S would be leaning against.

Figure 5:
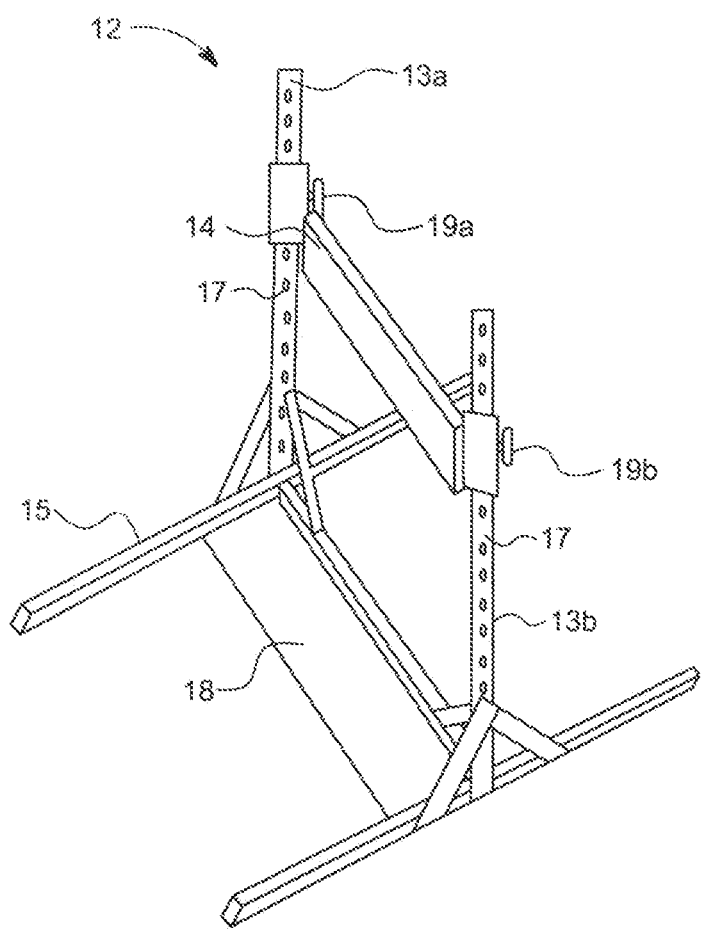
FIG. 5 is a perspective view of the adjustable-height barrier shown in FIG. 1.

As best shown in FIG. 5, the barrier reach instrument 12 includes a pair of vertical frame posts 13a, 13b supported by a base 15. The vertical posts 13a, 13b include a plurality of openings 17 therein for receiving removable securing pins 19 which are used to adjust the height of the barrier 14 so that different measurements can be obtained. According to a presently preferred embodiment of the invention, the barrier 14 moves vertically along a two frame posts 13a, 13b, and locks into place with spring loaded pins 19a, 19b.

While various heights and dimensions are anticipated, the variable barrier reach instrument 12 according to a presently preferred embodiment has a 4'×4'4" base 15 with two 62.5" vertical posts 13a, 13b, a 4'×12" non-slip foot plate 18, and a 4'×6" horizontal barrier 14. The barrier 14 can be set at various points starting at 18" to 60". Preferably, each vertical post 13a, 13b includes seven (7) pre-set openings for height adjustment ranging in 6-inch increments from 24 inches high to 60 inches high. The base 15 and vertical posts 13a, 13b may be constructed of any suitable material, including 2"×2"×⅛" square steel tubing. The barrier 14 may be of any dimension, and is preferably approximately 6 inches wide with a slight curvature.

A sensing and recording device 20 is positioned adjacent to the barrier reach instrument 12 for sensing and recording a plurality of data points (Max Y, Point 1, Max X, Point 2, Min Y). According to a preferred embodiment of the invention as shown in FIG. 1-FIG. 3C, the sensing and recording device 20 may comprise a two-dimensional grid 22 for sensing and recording the plurality of data points in the vertical (y) and horizontal (x) axes relative to the base point 16.

Figure 3A:
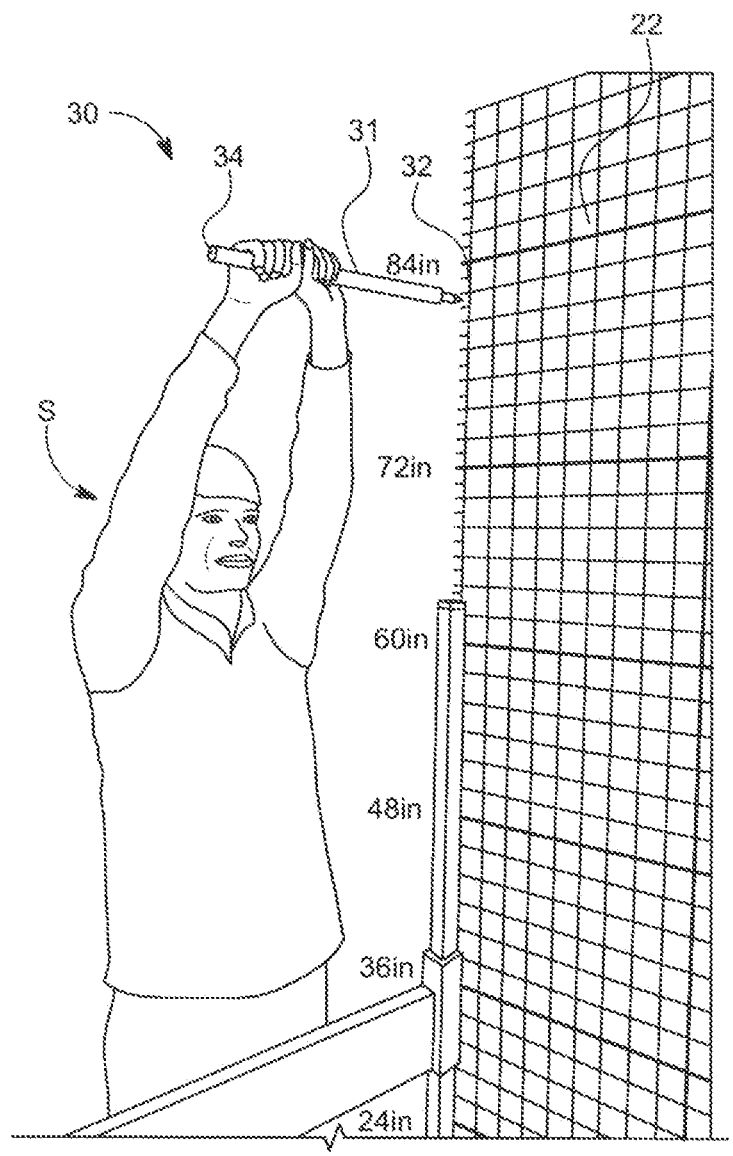
FIG. 3A is a side elevation view of a subject in the start position (Max Y) for performing the method for measuring an individual's ability to perform a varying range of barrier reaches according to a presently preferred embodiment of the invention.
Figure 3B:
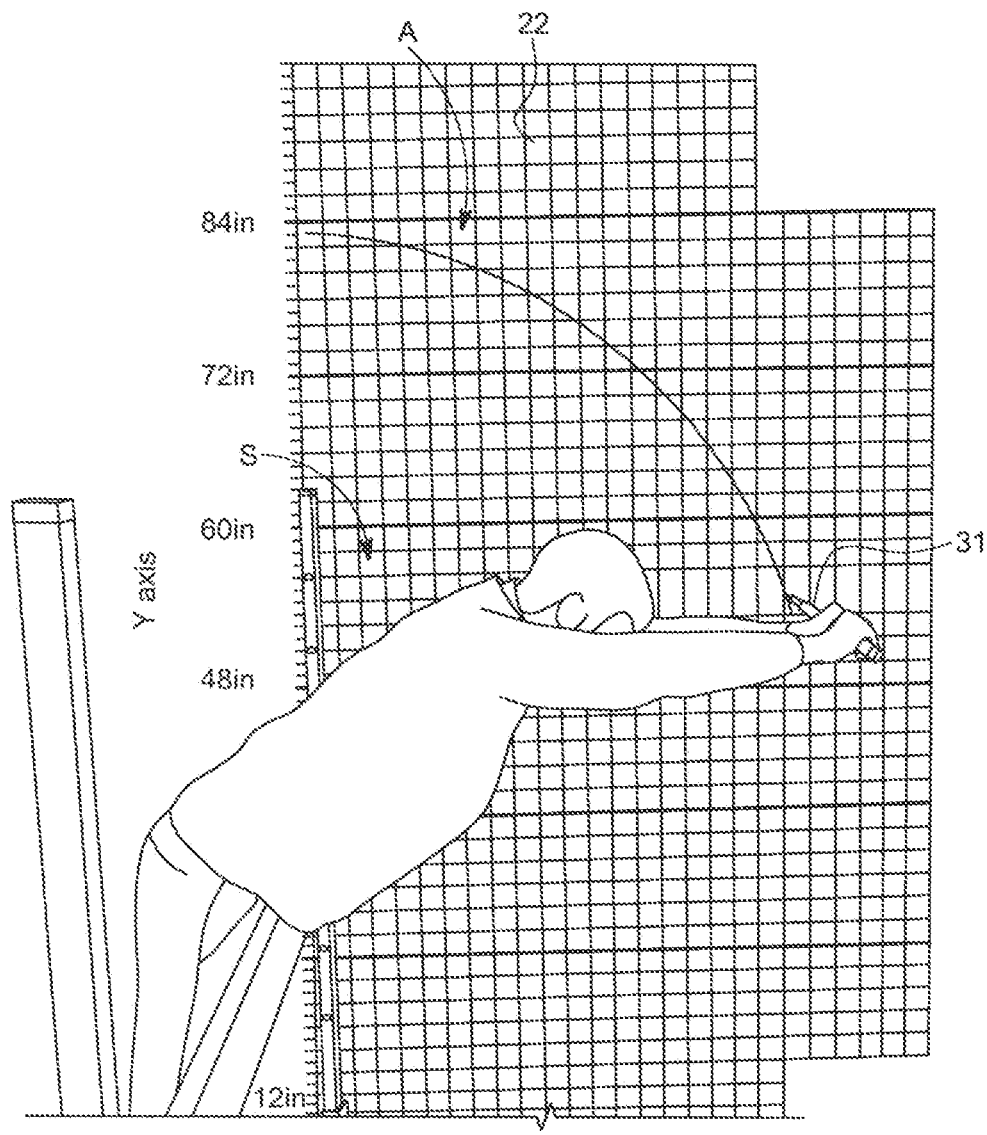
FIG. 3B is a side elevation view of a subject in an intermediate position for performing the method for measuring an individual's ability to perform a varying range of barrier reaches according to a presently preferred embodiment of the invention.
Figure 3C:
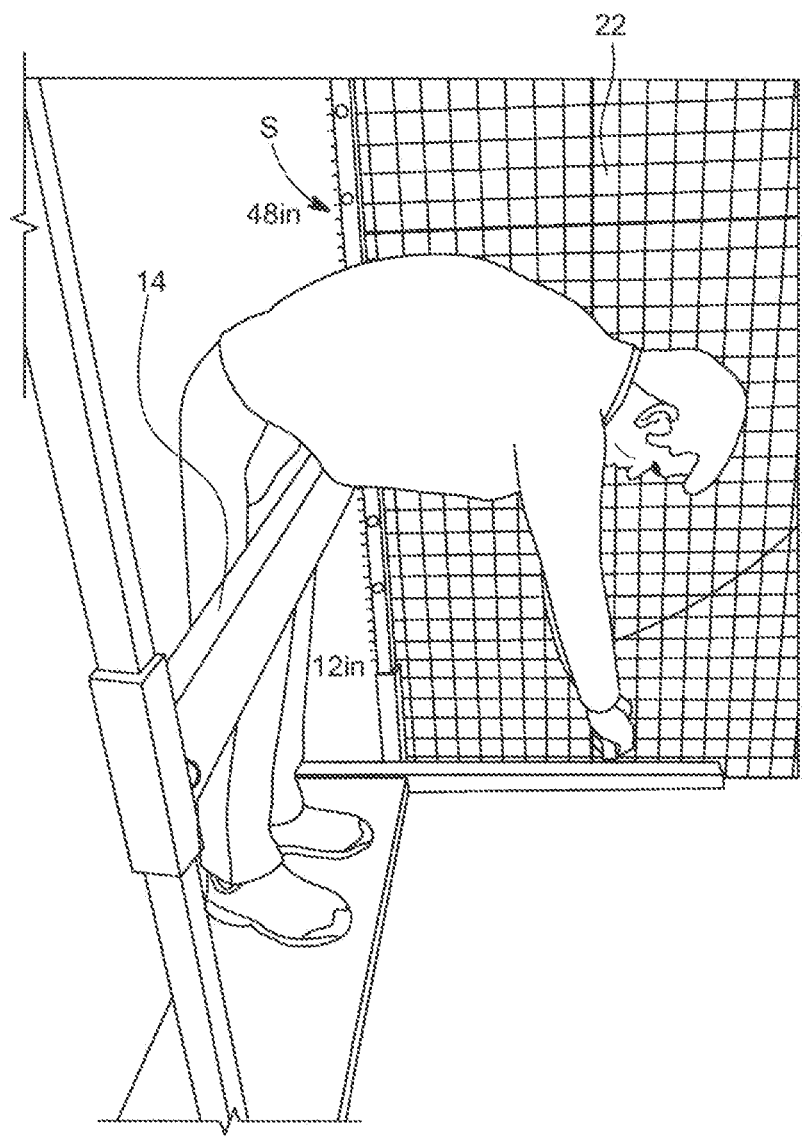
FIG. 3C is a side elevation view of a subject in the end position (Min Y) for performing the method for measuring an individual's ability to perform a varying range of barrier reaches according to a presently preferred embodiment of the invention.

As best shown in FIG. 3A, a marking device 30 is provided for grasping by the subject S. The marking device 30 may be a bar, for example a dowel rod 31, having a first end 32 and a second end 34. The first end 32 engages the sensing and recording device 20 for creating and arc A and the plurality of data points on the arc as the subject bends forward against the barrier 14 (FIG. 3A, FIG. 3B, FIG. 3C). The marking device 30 according to the preferred embodiment shown in the drawings includes a marking utensil at the end 32 thereof that engages the sensing and recording device 20 for creating a mark on the two-dimensional grid 22 as the subject bends forward against the barrier 14 with arms extended, thereby drawing an arc A on the grid 22. Preferably, the two-dimensional grid 22 is superimposed on an erasable surface such as a whiteboard 24 and the marking utensil is an erasable marker such as a whiteboard marker.

During functional testing, the subject S steps onto the foot plate 18 and while maintaining contact with the barrier 14, grasps a rod 31 and raises the rod 31 overhead as high as possible (see FIG. 3A). While, maintaining contact with the barrier 14, the candidate then reaches as far forward and downward as possible, creating an arc A of motion (see FIG. 3B and FIG. 3C). It is important for accuracy purposes that the dowel rod 31 remains horizontal and perpendicular to the grid 22 through the entire process.

Figure 2:
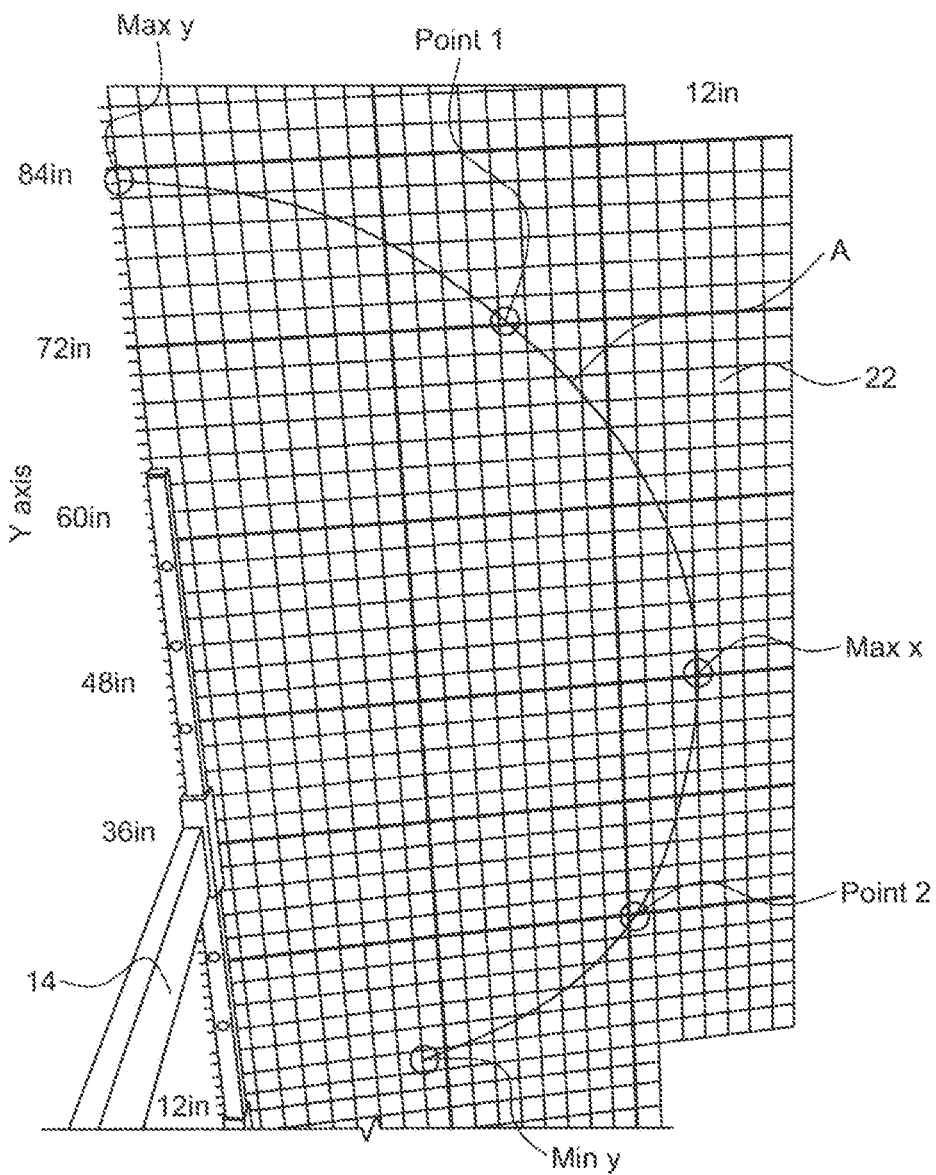
FIG. 2 is a side view in elevation of a portion of the apparatus shown in FIG. 1 with an example arc drawn on the sensing and recording device of the invention.

As most clearly shown in FIG. 2, the start point (Max Y) on the two-dimensional grid 22 is the point where the subject S is positioned with its feet at the base point 16 and its hands grasping a marking device 30 extended overhead as high as possible (see FIG. 3A). End point (Min Y) is the point on the two-dimensional grid 22 where an arc A is sensed and recorded on the two-dimensional grid 22 as the subject S bends forward against the barrier 14 and comes to an end at the lowest point in the vertical (y) axis above the base point 16 (see FIG. 3C). The furthest horizontal point (Max X) is at a point on the arc A in the horizontal (x) axis furtherest from the base point 16. The first point (Point 1) is the point that is midway between the start point (Max Y) and the furthest horizontal point (Max X). Lastly, the second point (Point 2) is a point that is midway between the end point (Min Y) and the furthest horizontal point (Max X).

A method for measuring a subject's ability to perform a varying range of barrier reaches is also provided according to the invention. As shown in FIG. 3A, the subject S is positioned at the barrier 14. The subject S is instructed to stand as far forward on the foot plate 18 of the variable barrier reach instrument 12 as possible, coming into contact with the barrier 14. The subject S grasps the marking device 30 which has a first end 32 that engages the sensing and recording device 20. The subject S raises the marking device 30 overhead as high as possible, without over-extending the shoulders or elbows, such that the first end 32 engages a surface 24 of the sensing and recording device 20, which is positioned adjacent to the barrier 14.

Next, as shown in FIG. 3B, the subject S bends forward, while maintaining contact between the first end 32 of the marking device 30 and the surface 24 of the sensing and recording device 20 thereby drawing an arc A within the grid 22 on the surface 24 of the sensing and recording device 20. The subject S continues to bend forward, reaching as far forward and downward as possible until the subject reaches the maximum point of extension, Min Y, as shown in FIG. 3C. Balance should be maintained throughout the entire arc, and the subject's heels should remain in contact with the foot plate 18. The subject S then returns to an upright position. The resulting arc A includes a plurality of data points, Max Y, Point 1, Max X, Point 2 and Min Y, which are identified, as discussed herein, and recorded. The recorded data points are then converted into an interpolated arc A' reflecting the subject's reach at a measured barrier height.

The method further includes the step of adjusting the height of the barrier and repeating the steps enumerated above for the new barrier height. This may be done at multiple barrier heights to obtain data for a subject S at several different barrier heights. According to one preferred embodiment of the method of the present invention, the process is repeated at seven pre-set variable heights ranging in 6-inch increments from 24 inches to 60 inches. Heights above and below that range are also anticipated depending on the specific needs of the test and the height of the subject.

Figure 6:
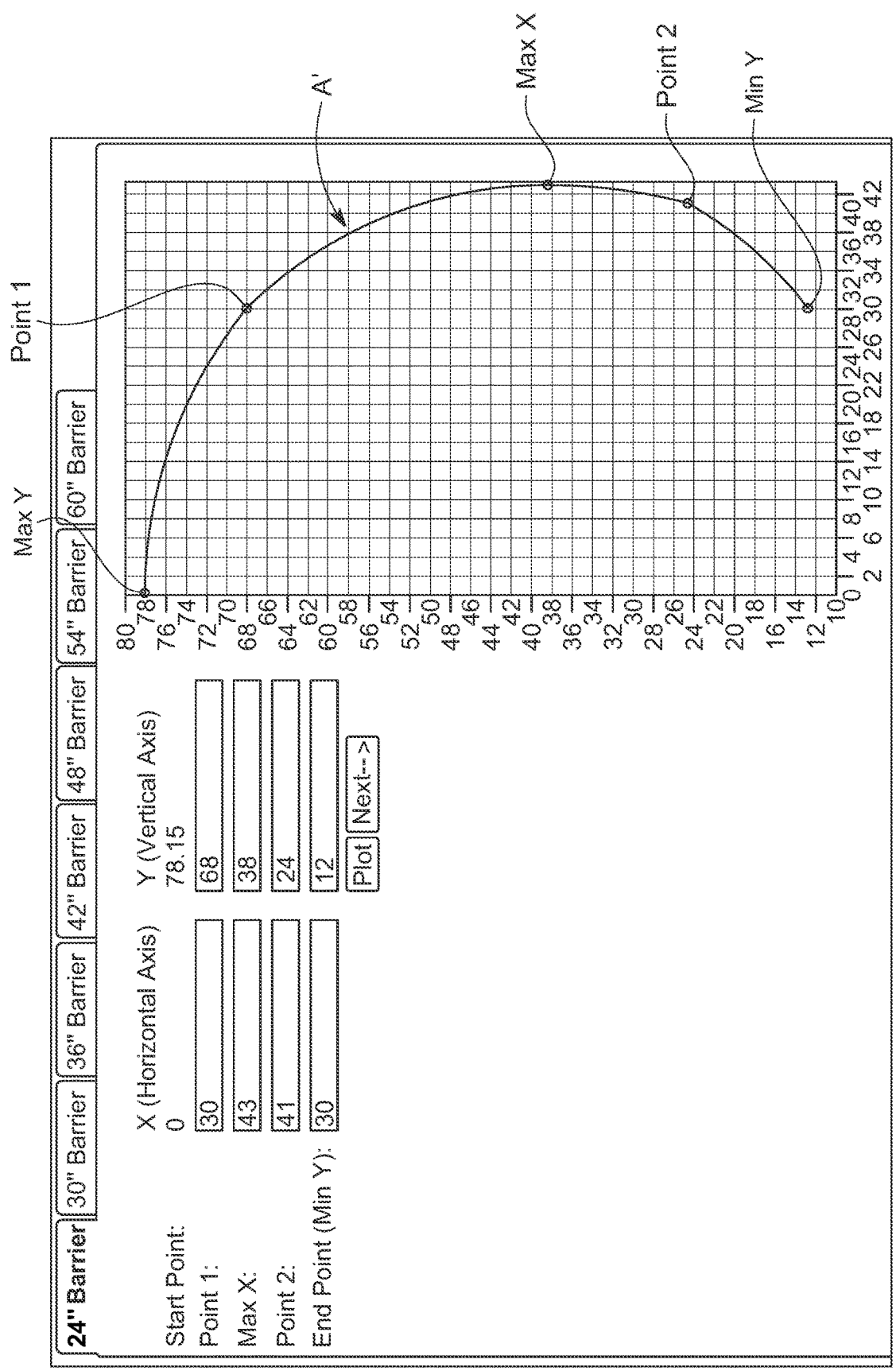
FIG. 6 is a diagram showing the step of identifying and recording data points according to a preferred embodiment of the invention.

The data points Max Y, Point 1, Max X, Point 2 and Min Y for each barrier height are recorded, for example, as shown in FIG. 6, in a computer software program. The five (5)—Max Y, Point 1, Max X, Point 2 and Min Y—x, y coordinates for each of the 7 barrier heights measured, ranging from 24"-60" are recorded. Each point is preferably entered as a whole number (rounding down). The user then selects 'Plot' in the software program to visually verify the generated arc A' vs. the candidate's actual drawn arc A. If the generated arc A' is >1.5 inch variance, the operator should verify the recorded points Max Y, Point 1, Max X, Point 2, Min Y again. The data is then entered for each of the next succeeding barrier heights and verified. Once all of the data points for all of the barrier heights are entered, the operator clicks "Save" to save the data.

Figure 4A:
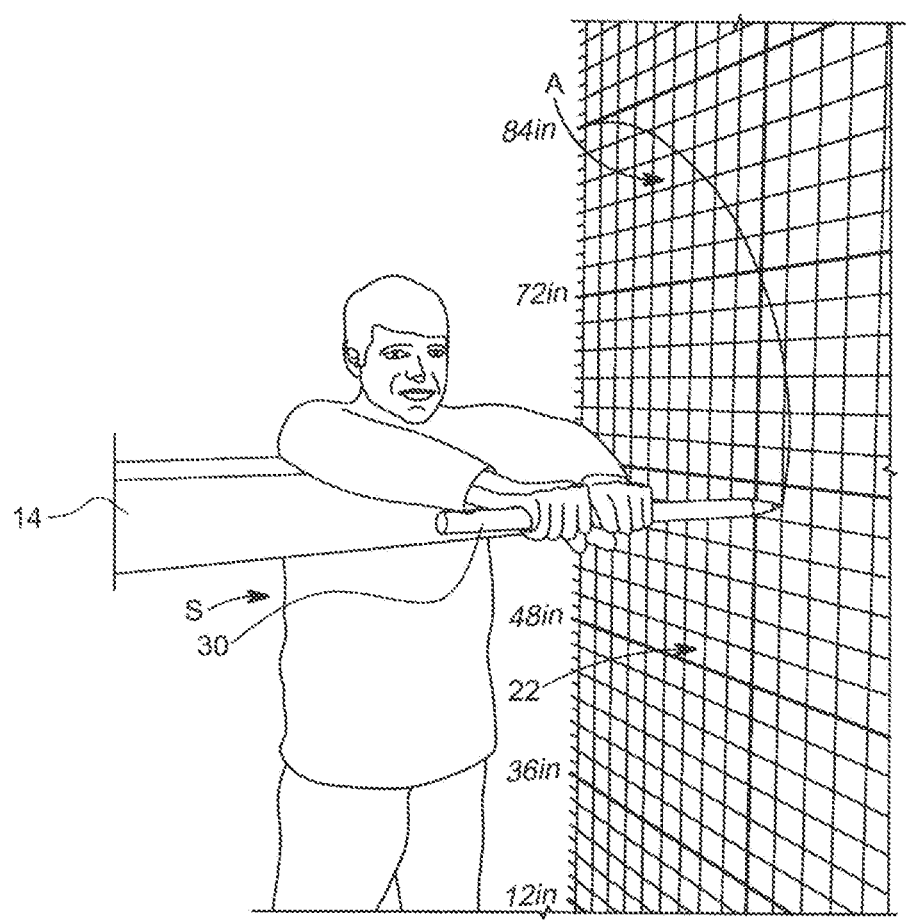
FIG. 4A is a side elevation view of a subject performing the method for measuring an individual's ability to perform a varying range of barrier reaches with the barrier in the maximum height position such that the end point (Min Y) corresponds with the furthest horizontal point (Max X), according to a presently preferred embodiment of the invention.
Figure 4B:
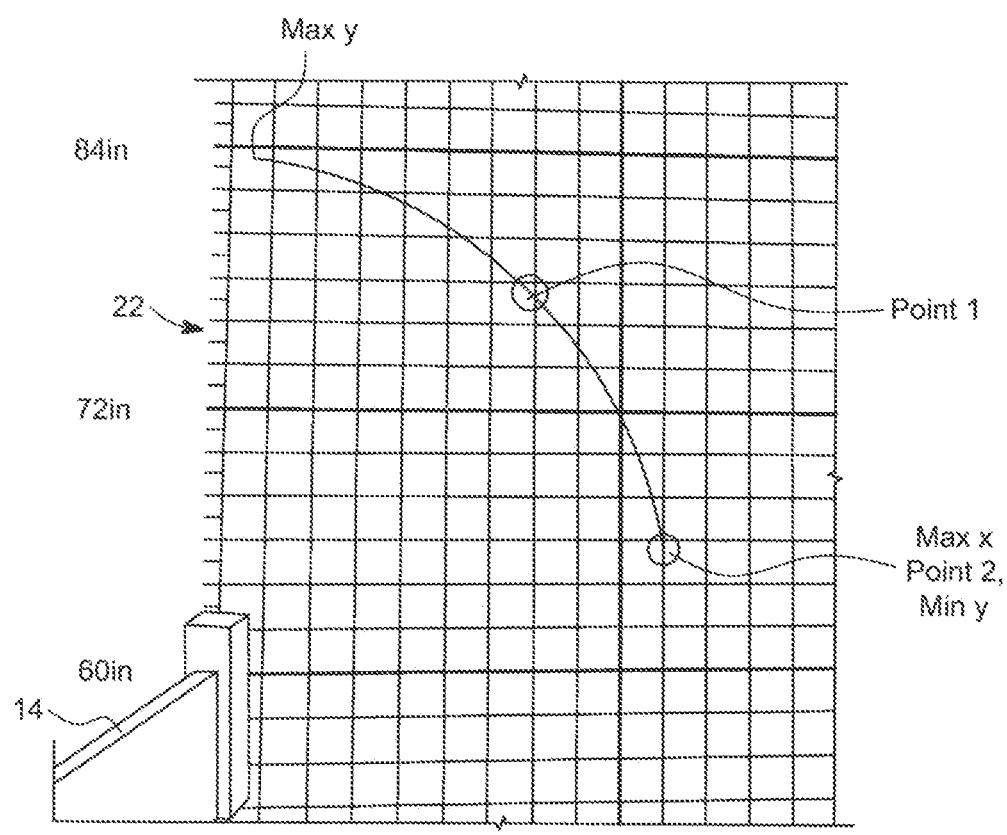
FIG. 4B is a side view in elevation of a portion of the apparatus shown in FIG. 4A with an example arc drawn on the sensing and recording device of the invention performed by the subject in FIG. 4A.

As shown in FIG. 4A and FIG. 4B, at higher barrier heights, a subject S may not be able to draw arc beyond Point 1. In this situation, the same coordinates apply to and are entered for Max X, Point 2 and End Point. If a subject S cannot draw an arc A at all, the Start Point Max Y is entered for all subsequent data points.

Processing means for converting the data points into an interpolated arc reflecting said subject's reach at a barrier height are also provided. The processing means generally consist of a computer processor (CPU) running a software program containing applicants' proprietary algorithms for interpolating the arc.

When using the system shown in FIG. 1-FIG. 4B, the five points (Max Y, Point 1, Max X, Point 2, Min Y) are measured and recorded for each desired barrier height. Then, from these five points, the processing means of the system will extrapolate (per the proprietary algorithm) the entire curve (all data points) for all measured barrier heights.

If reach is to be assessed for a barrier height that is between two measured barrier heights (27" for example)—a new reach curve associated with the barrier height between the two nearest measured barrier heights (24" and 30" in the example) is derived by linear interpolation with the proportional distance among the respective x and y coordinates of the new curve and the respective points (all points, not just five points) on the curves from the measured barrier heights equaling the proportional distance of the barrier height to be assessed relative to the heights of the nearest above and below barrier heights.

Figure 7:
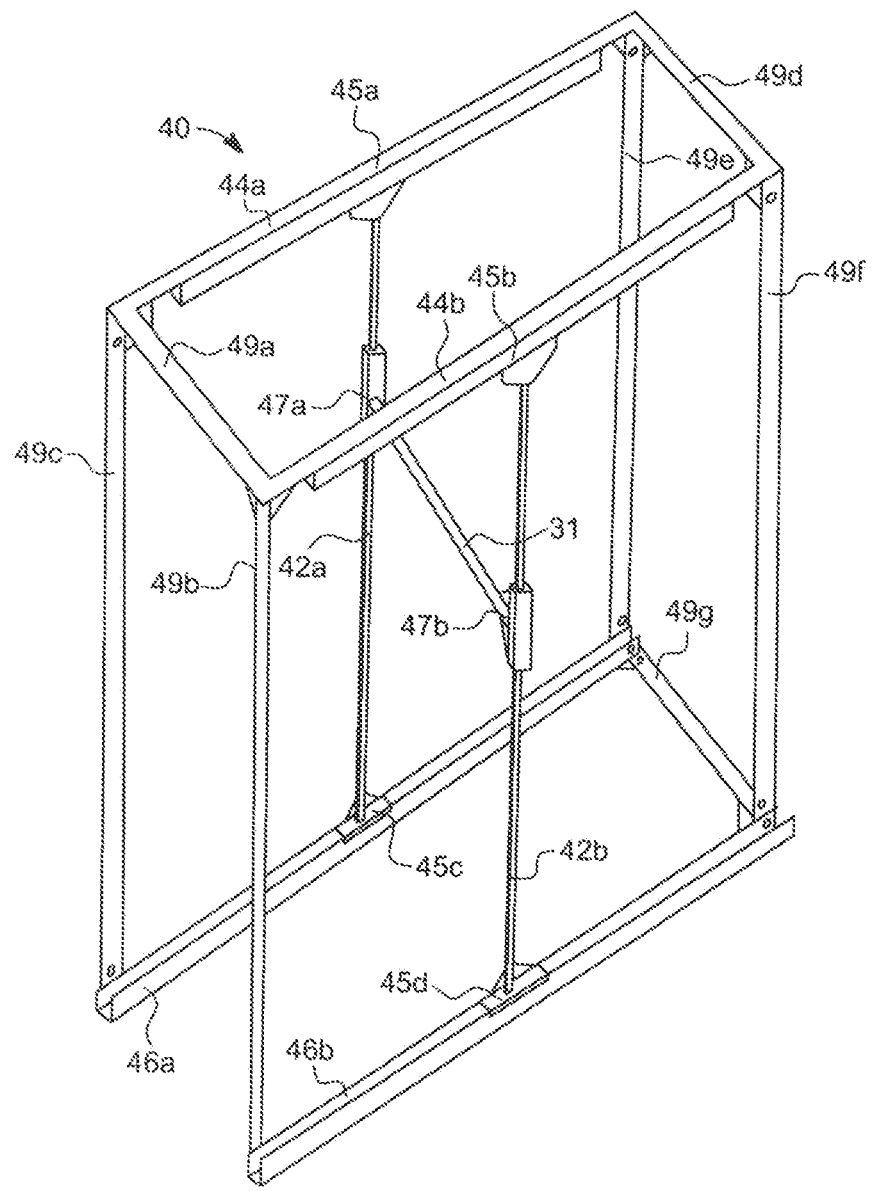
FIG. 7 is a perspective view of a reach rack frame that can be used in conjunction with the apparatus shown in FIG. 1.
Figure 8A:
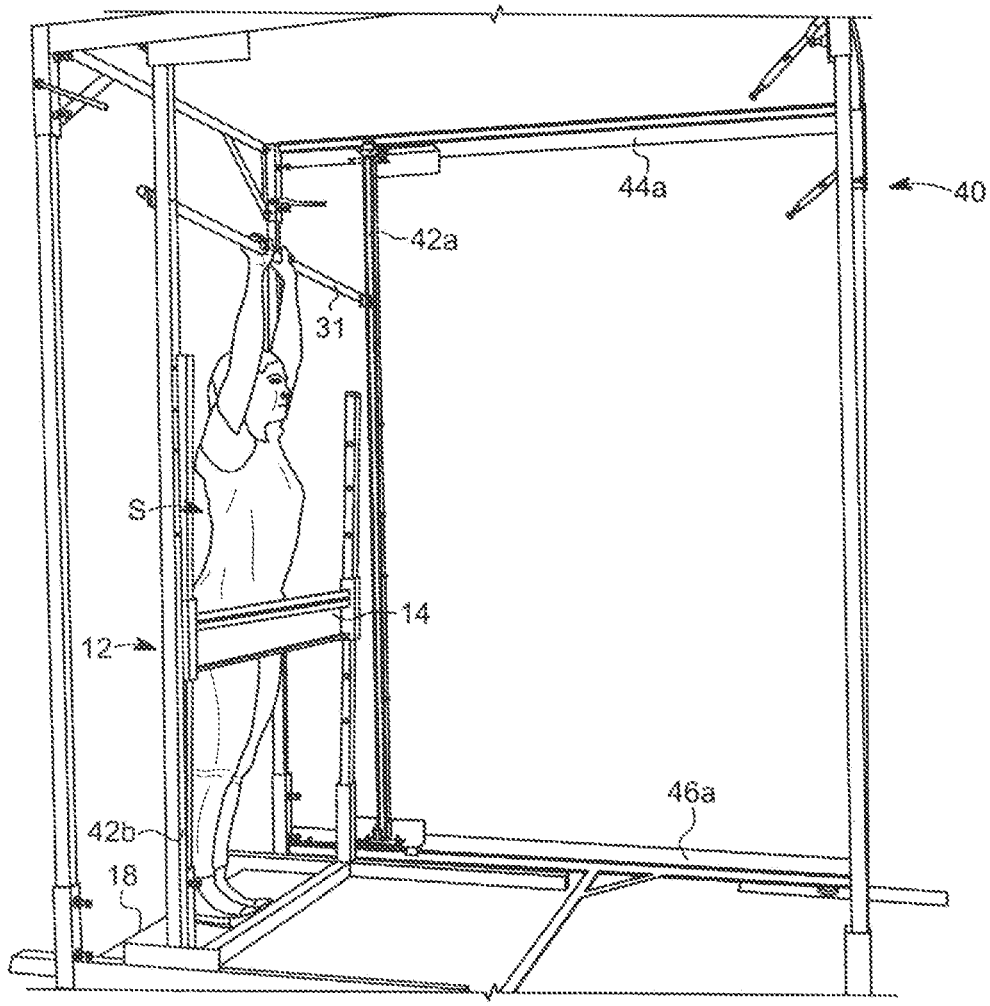
FIG. 8A is a side elevation view of a subject in the start position (Max Y) for performing the method for measuring an individual's ability to perform a varying range of barrier reaches incorporating the reach rack shown in FIG. 7.
Figure 8B:
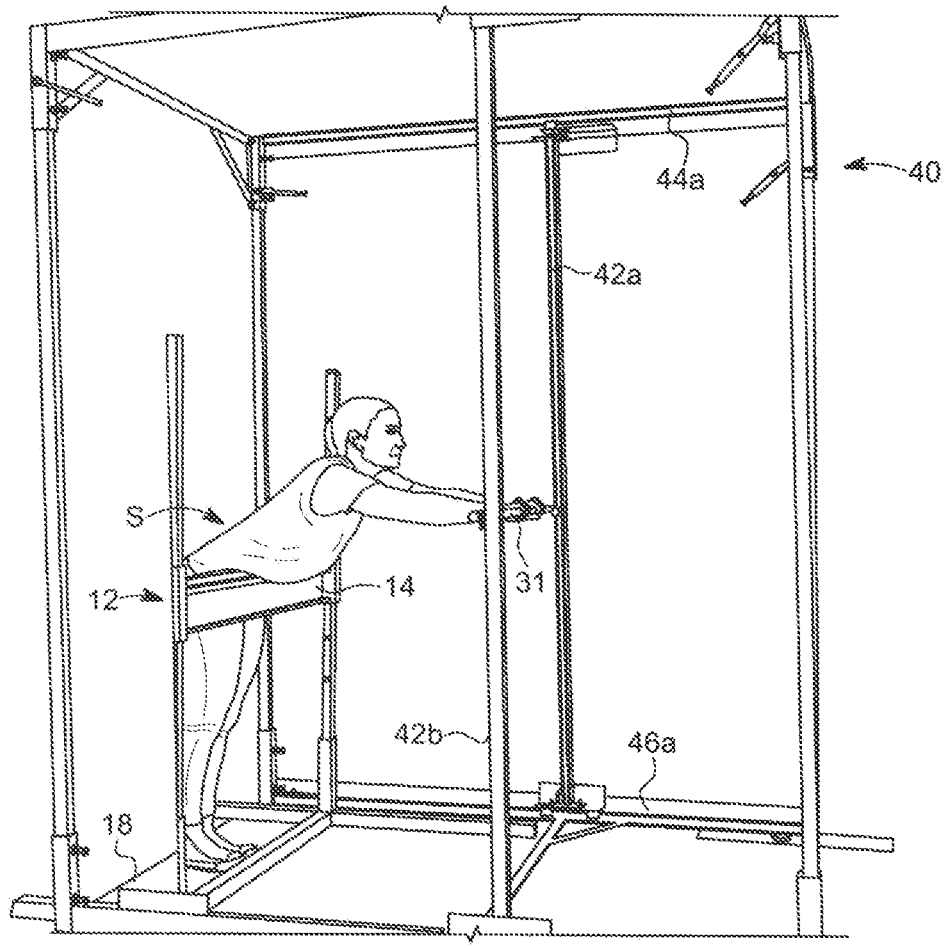
FIG. 8B is a side elevation view of a subject in an intermediate position for performing the method for measuring an individual's ability to perform a varying range of barrier reaches incorporating the reach rack shown in FIG. 7.

A further embodiment of the invention wherein the marking 30 device is contained within a variable barrier reach frame 40 that controls the movement of the marking device 30 relative to the sensing and recording device 20 is shown in FIG. 7-FIG. 8B.

The variable barrier reach frame 40 includes a first substantially vertical support rod 42a attached to the first end 32 of the marking device 30 and a second substantially vertical support rod 42b slideably attached to the second end 34 for controlling the movement of the marking device 30 in the vertical (y) axis relative to the base point 16. The reach rack frame 40 further includes an upper substantially horizontal pair of slide channels 44a, 44b which slideably engage upper ends of said first and second substantially vertical support rods 42a, 42b, and a lower substantially horizontal pair of slide channels 46a, 46b which slideably engage lower ends of said first and second substantially vertical support rods 42a, 42b for controlling the movement of the marking device 30 in the horizontal (x) axis relative to the base point 16.

The Variable Barrier Reach Frame 40 is intended to provide stability for full range of max reach and capture x,y coordinates while using the reach instrument. The Variable Barrier Reach Frame 40 may be of any suitable dimension, but for the average subject has a 4'10"×6'×9' frame with approximately 6' of linear rails along the top 44a, 44b and bottom 46a, 46b of each side. The linear rails 44a, 44b, 46a, 46b may be formed of any suitable material, but preferably are formed of 3"×3"×3"×⅛" C-shaped steel channel. The linear rails 44a, 44b, 46a, 46b are connected with vertical shafts 42a, 42b and a horizontal bar 31 allowing for simultaneous horizontal and vertical movement. Single bearing linear slides 45a, 45b, 45c, 45d are attached to the ends of the vertical shafts 42a, 42b and are slideably received in the grooves of linear rails 44a, 44b, 46a, 46b, respectively. The bar 31 may include a pair of pillow blocks 47a, 47b at the ends thereof for slideably engaging the round vertical shafts 42a, 42b.

Sensors capture x,y coordinates along horizontal and vertical rulers attached to the frame 40. The sensors may be affixed to the variable barrier reach frame 40 or they may be located near the frame and sense and measure movement of the bar 31. Alternatively, the variable barrier reach frame can be incorporated into the system of the primary embodiment such that the sensing and recording device 20 is positioned adjacent to the barrier reach instrument 12 and the variable barrier reach frame 40 for sensing and recording a plurality of data points (Max Y, Point 1, Max X, Point 2, Min Y). Additional bracing supports 49a, 49b, 49c, 49d, 49e, 49f, 49g, which are preferably formed from 3"×3"×⅛" angle steel, may be provided at the ends of the linear rails 42a, 42b, 44a, 44b to provide additional support to the variable barrier reach frame 40.

As shown in FIG. 8A, during functional testing, the subject S steps onto the foot plate 18 on Variable Barrier Reach Instrument 12, grasps the bar 31 and raises the bar 31 overhead as high as possible. While, maintaining contact with the barrier 14, the subject S then reaches as far forward and downward as possible (FIG. 8B), creating an arc of motion, as has been generally described herein.

The sensor(s) associated with the barrier reach frame 40 sense and record the entire reach curve, i.e. ALL data points of the curves associated with each measured barrier height, is automatically recorded in the system—not just the "five points." As above, if reach is to be assessed for a barrier height that is between two measured barrier heights (27" for example)—a new reach curve associated with the barrier height between the two nearest measured barrier heights (24" and 30" in the example) is derived by linear interpolation with the proportional distance among the respective x and y coordinates of the new curve and the respective points (all points, not just five points) on the curves from the measured barrier heights equaling the proportional distance of the barrier height to be assessed relative to the heights of the nearest above and below barrier heights.

While the sensing and recording device 20 and marking device 30 are described herein as being a white erase board and marker, it is anticipated, and is within the scope and intent of the invention to utilize electronic marking and sensing devices such that the data can be directly read and recorded to the software program without the need for manual entry. Also, while the invention is described in terms of a two arm reach measurement, it is within the scope of the invention to perform the same set of measurements for a single handed reach. Further, this detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. An apparatus for simulating, measuring and recording a subject's ability to perform a varying range of barrier reaches comprising:
   a variable barrier reach instrument for simulating an actual barrier that the subject may lean against in performing a work task, said variable barrier reach instrument including a physical barrier having a substantially horizontal upper surface at a height above a base point;
   a sensing and recording device positioned adjacent to the variable barrier reach instrument for sensing and recording a plurality of barrier reach data points as the subject bends forward against the physical barrier;
   a computer and an associated software program into which said recorded data points are entered, an algorithm contained within said software program that generates an interpolated arc reflecting said subject's reach at said physical barrier height from said recorded data points, and storage means associated with said computer for storing said interpolated arc and recorded data points.

2. The apparatus of claim 1 further comprising a marking device for grasping by the subject, said marking device having a first end thereof that engages the sensing and recording device for creating said plurality of data points and a second end.

3. The apparatus of claim 1 wherein the height of said physical barrier is adjustable.

4. The apparatus of claim 3 wherein the variable barrier reach instrument includes a plurality of pre-set variable heights.

5. The apparatus of claim 4 wherein the variable barrier reach instrument includes seven pre-set variable heights ranging in 6-inch increments from 24 inches to 60 inches.

6. The apparatus of claim 2 wherein the sensing and recording device comprises a two-dimensional grid for sensing and recording said plurality of data points in the vertical (y) and horizontal (x) axes relative to the base point.

7. The apparatus of claim 6 wherein the plurality of data points comprise:

a start point (Max Y) on the two-dimensional grid where the subject is positioned with its feet at the base point and its hands grasping the marking device extended overhead as high as possible;

an end point (Min Y) on the two-dimensional grid where an arc sensed and recorded on the two-dimensional grid as the subject bends forward against the physical barrier comes to an end at the lowest point in the vertical (y) axis above the base point.

a furthest horizontal point (Max X) at a point on the arc in the horizontal (x) axis farthest from the base point;

a first point that is midway between the start point and the furthest horizontal point; and a second point that is midway between the end point and the furthest horizontal point.

8. The apparatus of claim 6 wherein the marking device includes a marking utensil at the end thereof that engages the sensing and recording device for creating a mark on the two-dimensional grid as the subject bends forward against the physical barrier with arms extended thereby drawing an arc on said grid with said marking utensil.

9. The apparatus of claim 8 wherein the two-dimensional grid is superimposed on an erasable surface and the marking utensil is erasable.

10. The apparatus of claim 9 wherein the erasable surface is a whiteboard and the marking utensil is a whiteboard marker.

11. The apparatus of claim 2 wherein said marking device is contained within a reach rack frame that controls the movement of the marking device relative to the sensing and recording device.

12. The apparatus of claim 11 wherein the reach rack frame comprises:
means for controlling the movement of the marking device in the vertical (y) axis relative to the base point; and
means for controlling the movement of the marking device in the horizontal (x) axis relative to the base point.

13. The apparatus of claim 12 wherein the means for controlling the movement of the marking device in the vertical axis comprises a first substantially vertical support rod slideably attached to the first end of the marking device and a second substantially vertical support rod slideably attached to the second end of the marking device.

14. The apparatus of claim 13 wherein the means for controlling the movement of the marking device in the horizontal (x) axis comprises an upper substantially horizontal pair of slide channels which slideably engage upper ends of said first and second substantially vertical support rods, and a lower substantially horizontal pair of slide channels which slideably engage lower ends of said first and second substantially vertical support rods.

15. A method for simulating, measuring and recording a subject's ability to perform a varying range of barrier reaches comprising the steps of:
(1) positioning the subject at a variable barrier reach instrument for simulating an actual barrier that the subject may lean against in performing a work task, said variable barrier reach instrument having a physical barrier having a substantially horizontal upper surface at a height above a base point;
(2) having the subject grasp a marking device having a first end thereof that engages a sensing and recording device positioned adjacent to the physical barrier;
(3) having the subject raise the marking device overhead such that the first end of the marking device engages a surface of said sensing and recording device;
(4) having the subject bend forward, while maintaining contact between the first end of the marking device and the surface of the sensing and recording device thereby drawing an arc on said sensing and recording device which includes a plurality of data points;
(5) identifying and recording each of said plurality of data points in a software program associated with a computer;
(6) applying an algorithm contained in the software program to said recorded data points to generate an interpolated arc reflecting said subject's reach at said physical barrier height from said recorded data points, and
(7) storing said interpolated arc and recorded data points in storage means associated with said computer.

16. The method of claim 15 further comprising the further step of adjusting the height of the physical barrier and repeating steps (1)-(6) at the adjusted physical barrier height.

17. The method of claim 16 wherein steps (1)-(6) are repeated sequentially for seven pre-set variable heights ranging in 6-inch increments from 24 inches to 60 inches.

18. The method of claim 15 wherein the step of identifying and recording said plurality of data points comprises the steps of:
identifying and recording a start point (Max Y) on the sensing and recording device where the subject is positioned with its feet at the base point and its hands grasping the marking device extended overhead as high as possible;
identifying and recording an end point (Min Y) on the sensing and recording device where an arc sensed and recorded on the two-dimensional grid as the subject bends forward against the physical barrier comes to an end at the lowest point in the vertical (y) axis above the base point;
identifying and recording a furthest horizontal point (Max X) at a point on the arc in the horizontal (x) axis farthest from the base point;
identifying and recording a first point that is midway between the start point and the furthest horizontal point; and
identifying and recording a second point that is midway between the end point and the furthest horizontal point.

19. The method of claim 15 wherein the step of positioning a subject at a variable barrier reach instrument includes having the subject come into contact with said physical barrier.

20. A method for simulating, measuring and recording a subject's ability to perform a varying range of barrier reaches comprising the steps of:
(1) positioning the subject at a variable barrier reach instrument for simulating an actual barrier that the subject may lean against in performing a work task, said variable barrier reach instrument having a physical barrier having a substantially horizontal upper surface at a height above a base point;
(2) having the subject raise his arms overhead;
(3) having the subject bend forward, while maintaining his arms extended;
(4) identifying a plurality of data points on a sensing and recording device along an arc that is generated as the subject's hands pass alongside the sensing and recording device;

(5) recording said plurality of data points in a software program associated with a computer;
(6) applying an algorithm contained in the software program to said recorded data points to generate an interpolated arc reflecting said subject's reach at said physical barrier height from said recorded data points, and
(7) storing said interpolated arc and recorded data points in storage means associated with said computer.

\* \* \* \* \*